Oct. 27, 1925.  1,559,509
G. W. PRINCE ET AL
SMELTING FURNACE AND THE METHOD OF SMELTING ORES THEREIN
Filed June 9, 1925
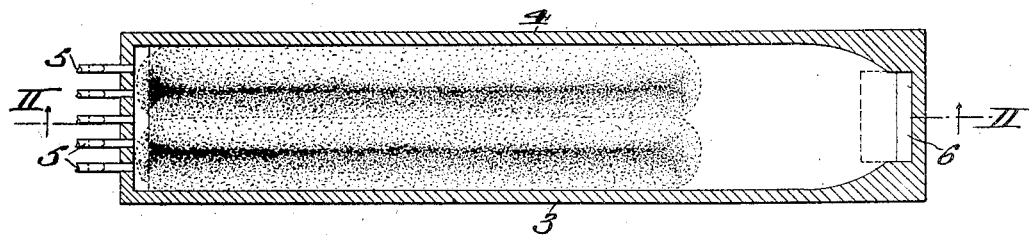
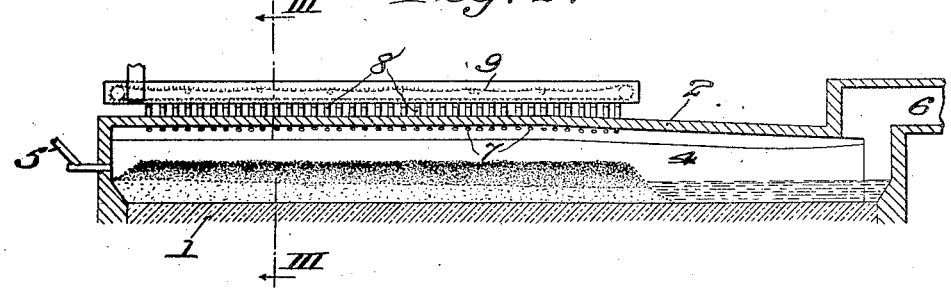
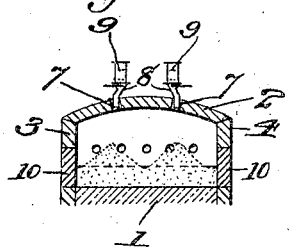

Patented Oct. 27, 1925.

1,559,509

UNITED STATES PATENT OFFICE.

GEORGE W. PRINCE, OF CLEMENCEAU, ARIZONA, AND ARCHIBALD DOUGLAS, OF NEW YORK, N. Y., ASSIGNORS TO UNITED VERDE EXTENSION MINING COMPANY, OF NEW YORK, N. Y., A CORPORATION OF DELAWARE.

SMELTING FURNACE AND THE METHOD OF SMELTING ORES THEREIN.

Application filed June 9, 1925. Serial No. 35,863.

*To all whom it may concern:*

Be it known that we, GEORGE W. PRINCE and ARCHIBALD DOUGLAS, citizens of the United States, and residents, respectively, of Clemenceau, in the county of Yavapai and State of Arizona, and of the borough of Manhattan, in the city and State of New York, have invented a new and useful Improvement in Smelting Furnaces and the Method of Smelting Ores Therein, of which the following is a specification.

The object of this invention is to provide novel means for and method of feeding ores into a reverberatory furnace whereby a more rapid and effective smelting of the ores as well as great economy in fuel is obtained by depositing the ores on the floor of the furnace, to form a plurality of continuous longitudinal mounds with their apices spaced from each other and from the unfettled side walls of the furnace, the outer sides of the mounds sloping to the said side walls of the furnace to form valleys for the flow of the molten material along the side walls and between the mounds.

A further object is to provide means for feeding the ores into the furnace substantially continuously so that the continuous longitudinal mounds will be maintained during the smelting operation and thereby the most effective and economical smelting of the ores may be obtained.

In the accompanying drawings;

Fig. 1 represents a reverberatory furnace in horizontal section with the improvements incorporated therein.

Fig. 2 represents a longitudinal vertical section through the furnace, taken in the plane of the line II—II, of Fig. 1.

Fig. 3 represents a transverse vertical section through the furnace, taken in the plane on the line III—III of Fig. 2.

The furnace floor is represented by 1, the arched roof by 2 and the unfettled side walls by 3, 4. This furnace may be provided at its floor end with the usual nozzles 5 for introduction of the heating medium, and its other end with the usual flue 6.

In the present instance where two longitudinal mounds of ore are to be formed and maintained on the floor of the furnace, the roof 2 is provided with two longitudinal rows of closely spaced passages 7, the rows being spaced about equally distant from each other and from the side walls, through which passages the ores are fed in from gated hoppers 8, communicating with a suitable feeding mechanism 9, in such a manner that the continuous longitudinal mounds of ores are formed and maintained with the apices of the mounds spaced from each other and from the unfettled side walls 3 and 4 of the furnace, thereby producing valleys between the adjacent sloping sides of the mounds and also between the outer sides of the mounds and the side walls of the furnace, along which valleys the molten material flows to the flue end of the furnace.

It is intended that this feeding of the ores shall be substantially continuous so that the continuous longitudinal mounds will be maintained at the proper height to utilize the effect of the heating medium most economically and at the same time to present a very extended ore surface to the action of said heating medium. This substantially continuously feeding in of the ores, as distinguished from periodic feeding in, permits the ores to be submitted to the action of the heating medium at a time when the ores most readily absorb the heat of the heating medium.

If found necessary, a greater or lesser portion of each of the side walls may be made of non-corrosive material such, for instance, as magnesite or chrome bricks 10, where the molten material comes into contact with the said side walls.

What we claim is:—

1. The method of smelting ores in reverberatory furnaces which consists in substantially continuously feeding the ores into the furnace chamber in such a manner that a plurality of continuous longitudinal mounds are formed and maintained with the apices spaced from each other and from the side walls of the furnace chamber, and subjecting the mounds to the action of a heating medium.

2. The method of smelting ores in reverberatory furnaces which consists in substantially continuously feeding the ores into the furnace chamber in such a manner that two continuous longitudinal mounds are formed and maintained with their apices spaced from each other and from the side walls of the furnace chamber, and subjecting the mounds to the action of a heating medium.

3. The method of smelting ores in reverberatory furnaces which consists in feeding the ores into the furnace chamber in such a manner that a plurality of continuous longitudinal mounds are formed with their apices spaced from each other and their outer sloping sides leading to the side walls of the furnace chamber, and subjecting the mounds to the action of a heating medium.

4. The method of smelting ores in reverberatory furnaces which consists in feeding the ores into the furnace chamber in such a manner that two continuous longitudinal mounds are formed with their apices spaced from each other and their outer sloping sides leading to the side walls of the furnace chamber, and subjecting the mounds to the action of a heating medium.

5. The method of smelting ores in reverberatory furnaces which consists in substantially continuously feeding the ores into the furnace chamber in such a manner that a plurality of continuous longitudinal mounds are formed and maintained with their apices spaced from each other and their outer sloping sides leading to the side walls of the furnace chamber, and subjecting the mounds to the action of a heating medium.

6. The method of smelting ores in reverberatory furnaces which consists in substantially continuously feeding the ores into the furnace chamber in such a manner that two continuous longitudinal mounds are formed and maintained with their apices spaced from each other and their outer sloping sides leading to the side walls of the furnace chamber, and subjecting the mounds to the action of a heating medium.

7. In a reverberatory furnace, means for feeding the ores into the furnace chamber to form a plurality of continuous longitudinal mounds with their apices spaced from each other and from the side walls of the furnace chamber, and means for subjecting the mounds to the action of a heating medium.

8. In a reverberatory furnace, means for feeding the ores into the furnace chamber to form two continuous longitudinal mounds with their apices spaced from each other and from the side walls of the furnace chamber, and means for subjecting the mounds to the action of a heating medium.

9. In a reverberatory furnace, means for feeding the ores into the furnace chamber to form a plurality of continuous longitudinal mounds with their apices spaced from each other and their outer sloping sides leading to the side walls of the furnace chamber, and means for subjecting the mounds to the action of a heating medium.

10. In a reverberatory furnace, means for feeding the ores into the furnace chamber to form two continuous longitudinal mounds with their apices spaced from each other and their outer sloping sides leading to the side walls of the furnace chamber, and means for subjecting the mounds to the action of a heating medium.

11. In a reverberatory furnace, means for substantially continuously feeding the ores into the furnace chamber to form and maintain a plurality of continuous longitudinal mounds with their apices spaced from each other and their outer sloping sides leading to the side walls of the furnace chamber, and means for subjecting the mounds to the action of a heating medium.

12. In a reverberatory furnace, means for substantially continuously feeding the ores into the furnace chamber to form and maintain two continuous longitudinal mounds with their apices spaced from each other and their outer sloping sides leading to the side walls of the furnace chamber, and means for subjecting the mounds to the action of a heating medium.

13. In a reverberatory furnace, means for feeding the ores into the furnace chamber to form a plurality of continuous longitudinal mounds with their apices spaced from each other and their outer sloping sides leading to the side walls of the furnace chamber to produce valleys for the flow of the molten material along said side walls and between said mounds, portions of said side walls being formed of a non-corrosive material, and means for subjecting the mounds to the action of a heating medium.

14. In a reverberatory furnace, means for feeding the ores into the furnace chamber to form two continuous longitudinal mounds with their apices spaced from each other and their outer sloping sides leading to the side walls of the furnace chamber to produce valleys for the flow of the molten material along said side walls and between said mounds, portions of said side walls being formed of a non-corrosive material, and means for subjecting the mounds to the action of a heating medium.

15. In a reverberatory furnace, means for feeding the ores into the furnace chamber to form a plurality of continuous longitudinal mounds with their apices spaced from each other and their outer sloping sides leading to the side walls of the furnace chamber to produce valleys for the flow of the molten material along the said side walls and between said mounds, portions of said side walls which come in contact with the molten material being formed of a non-corrosive material, and means for subjecting the mounds to the action of a heating medium.

16. In a reverberatory furnace, means for feeding the ores into the furnace chamber to form two continuous longitudinal mounds with their apices spaced from each other and their outer sloping sides leading to the side walls of the furnace chamber to produce valleys for the flow of the molten material along the said side walls and between said mounds, portions of said side walls which come in contact with the molten material being formed of a non-corrosive material, and means for subjecting the mounds to the action of a heating medium.

17. In a reverberatory furnace having a plurality of rows of passages opening through its roof into the furnace chamber at predetermined distances from the side walls thereof, means for substantially continuously feeding the ores through said passages into the furnace chamber to form continuous longitudinal mounds with their apices spaced from each other and from the said side walls, and means for subjecting the mounds to the action of a heating medium.

18. In a reverberatory furnace having two rows of passages opening through its roof into the furnace chamber at predetermined distances from the side walls thereof, means for substantially continuously feeding the ores through said passages into the furnace chamber to form continuous longitudinal mounds with their apices spaced from each other and from the said side walls, and means for subjecting the mounds to the action of a heating medium.

19. A reverberatory furnace having unfettled side walls, means for feeding the ores into the furnace chamber to form a plurality of continuous longitudinal mounds with their apices spaced from each other, and means for subjecting the mounds to the action of a heating medium.

20. A reverberatory furnace having unfettled side walls, means for feeding the ores into the furnace chamber to form two continuous longitudinal mounds with their apices spaced from each other, and means for subjecting the mounds to the action of a heating medium.

21. A reverberatory furnace having unfettled side walls, means for substantially continuously feeding the ores into the furnace chamber to form a plurality of continuous longitudinal mounds with their apices spaced from each other, and means for subjecting the mounds to the action of a heating medium.

22. A reverberatory furnace having unfettled side walls, means for substantially continuously feeding the ores into the furnace chamber to form two continuous longitudinal mounds with their apices spaced from each other, and means for subjecting the mounds to the action of a heating medium.

23. A reverberatory furnace having unfettled side walls, means for feeding the ores into the furnace chamber to form a plurality of continuous longitudinal mounds with their apices spaced from each other, and means for subjecting the mounds to the action of a heating medium, the portions of the side walls which are exposed to the molten material being of non-corrosive material.

In testimony, that we claim the foregoing as our joint invention, we have signed our names this 21 day of May, 1925, and this 15th day of May, 1925.

GEORGE W. PRINCE.
ARCHIBALD DOUGLAS.